United States Patent [19]

Kunimoto et al.

[11] Patent Number: 4,810,419

[45] Date of Patent: Mar. 7, 1989

[54] SHAPED ELECTROCONDUCTIVE AROMATIC IMIDE POLYMER ARTICLE AND PROCESS FOR PRODUCING

[75] Inventors: Akihiro Kunimoto; Seiichirou Takabayashi; Morio Nakamura; Tatuaki Maeda, all of Ube, Japan

[73] Assignee: Ube Industries Ltd., Yamaguchi, Japan

[21] Appl. No.: 117,431

[22] Filed: Nov. 2, 1987

Related U.S. Application Data

[62] Division of Ser. No. 864,301, May 16, 1986, abandoned.

[30] Foreign Application Priority Data

May 17, 1985 [JP] Japan .................. 60-103677

[51] Int. Cl.$^4$ .................. H01B 1/24; C08G 73/10
[52] U.S. Cl. .................. 252/511; 252/502; 264/29.2; 264/105; 264/331.12; 428/303; 428/473.5; 524/847; 524/879
[58] Field of Search .................. 252/511; 428/473.5, 428/303; 264/211, 29.2, 105, 331.12; 524/847, 879

[56] References Cited

U.S. PATENT DOCUMENTS

| 3,406,126 | 10/1968 | Litant .................. 252/511 |
| 3,654,187 | 4/1972 | Takenaka et al. .................. 252/511 |
| 3,654,227 | 4/1972 | Dine-Hart .................. 428/473.5 |
| 3,697,450 | 10/1972 | Takenaka et al. .................. 252/511 |

FOREIGN PATENT DOCUMENTS 60-26034 2/1985 Japan .

Primary Examiner—Philip Anderson
Attorney, Agent, or Firm—Burgess, Ryan & Wayne

[57] ABSTRACT

A shaped electroconductive aromatic imide polymer article comprising an aromatic imide polymer matrix and 10% to 40% by weight of short cut carbon fibers 1 to 30 μm thick and 0.05 to 3.0 mm long dispersed in the matrix, is produced by admixing a slurry of the short cut carbon fibers having a limited moisture content of 1.0% or less in a polymerization medium, with a polymerization mixture containing an aromatic tetracarboxylic acid component and an aromatic diamine component, by subjecting the resultant admixture to a polymerization procedure to prepare a dope comprising a resultant polymerization product, the carbon fibers and the polymerization medium, and by subjecting the dope to shaped article-producing procedures in which the dope is shaped into a desired form and the shaped dope is solidified by removing the polymerization medium to provide a desired shaped article.

5 Claims, No Drawings

SHAPED ELECTROCONDUCTIVE AROMATIC IMIDE POLYMER ARTICLE AND PROCESS FOR PRODUCING

This application is a division of application Ser. No. 864,301, filed May 16, 1986, and now abandoned.

BACKGROUND OF THE INVENTION

1. Field of the Invention

The present invention relates to a shaped electroconductive aromatic imide polymer article and a process for producing the same.

More particularly, the present invention relates to a shaped article comprising an aromatic imide polymer matrix and specific short cut carbon fibers evenly dispersed in the matrix, and having an enhanced electroconductivity and an excellent heat resistance, and a process for producing the same.

2. Description of the Related Arts

Japanese Unexamined Patent Publication No. 60-26034 for Ube Industries Co. discloses a process for producing a light-shielding polyimide film from a composition comprising an aromatic imide polymer or its precursor and carbon black particles. However, this type of light-shielding polyimide film contains only a small amount of the carbon black particles and, therefore, exhibits an unsatisfactory electroconductivity. Also, the light-shielding polyimide film exhibits an unsatisfactory heat stability and, therefore, is disadvantageous in that, at a high temperature, the dimensions of the film are altered and the film is deformed; for example, becomes corrugated or wrinkled.

Generally, it is known that the procedure for admixing electroconductive solid particles, for example, short cut carbon fibers, in a large content with an aromatic imide polymer or its precursor polymer, and the preparation procedure for a dope containing electroconductive solid particles, especially short cut carbon fibers, dispersed in a large content in a solution of an aromatic imide polymer or its precursor, are difficult due to the large content of the carbon fibers. Therefore, it has been believed that the industrial production of an aromatic imide polymer shaped article having a satisfactory electroconductivity at a high efficiency is also difficult.

Also, it has been found that when an aromatic polyimide film is produced from an aromatic imide polymer or its precursor and a large content of electroconductive solid particles, a number of small bubbles are contained in the film or the electroconductive solid particles are unevenly dispersed in the polymer matrix. Therefore, the resultant film usually exhibits an unsatisfactory heat resistance and mechanical strength.

SUMMARY OF THE INVENTION

An object of the present invention is to provide a shaped aromatic imide polymer article containing a large amount of carbon fibers evenly dispersed in the article and, therefore, having an excellent electroconductivity and heat resistance and a satisfactory mechanical strength, and a process for producing the same at a satisfactory efficiency and productivity.

The above-mentioned object is attained by the shaped electroconductive aromatic imide polymer article, and the process for producing the same, of the present invention.

The shaped electroconductive aromatic imide polymer article of the present invention comprises a matrix comprising at least one aromatic imide polymer and 10% to 40% by weight of short cut carbon fibers having a thickness of 1 to 30 $\mu$m and a length of 0.05 to 3.0 mm and evenly dispersed in the aromatic imide polymer matrix.

The shaped article may be in the form of a film or sheet.

The process of the present invention for producing a shaped electroconductive aromatic imide polymer article comprises the steps of drying short cut carbon fibers having a thickness of 1 to 30 $\mu$m and a length of 0.05 to 3.0 mm to a moisture content of 1.0% by weight or less; dispersing the dried carbon fibers in an organic polymerization medium to provide a slurry; admixing the slurry to a polymerization mixture containing an aromatic tetracarboxylic acid component and an aromatic diamine component; subjecting the resultant admixture to a polymerization procedure to provide a dope containing the resultant polymerization product dissolved in the polymerization medium and the carbon fibers dispersed in the polymerization product solution; and subjecting the resultant dope to shaped article-producing procedures wherein the dope is shaped to a desired form and the shaped dope is solidified by removing the polymerization medium, to provide a desired shaped article comprising a matrix having the resultant aromatic imide polymer and 10% to 40% by weight of the carbon fibers evenly dispersed in the aromatic imide polymer matrix.

In the present invention, a large amount of 10% to 40% of short cut carbon fibers can be evenly dispersed in an aromatic imide polymer matrix by controlling the moisture content of the carbon fibers having a specific thickness and length to a small value of 1.0% by weight or less, and by producing the aromatic imide polymer or its precursor in a polymerization medium in the presence of the carbon fibers evenly dispersed in the polymerization medium. This important feature was discovered by the inventors of the present invention for the first time, and this discovery allowed the specific shaped electroconductive aromatic imide polymer article in which a large amount of carbon fibers are evenly distributed, to be actually produced for the first time.

DESCRIPTION OF THE PREFERRED EMBODIMENTS

The shaped electroconductive aromatic imide polymer article of the present invention is formed from a polymeric composition comprising a matrix having at least one aromatic imide polymer and a large amount, that is, 10% to 40% by weight, preferably 15% to 35% by weight, of short cut carbon fibers having a thickness of from 1 to 30 $\mu$m, preferably 5 to 20 $\mu$m, and a length of 0.05 to 3.0 mm, preferably 0.1 to 2.0 mm.

When the carbon fiber has a circular cross-sectional profile, the term "thickness" of the fiber refers to length of a diameter of the fiber. When the carbon fiber has a non-circular cross-sectional profile, the term "thickness" of the fiber refers to a length of a largest (major) axis of the profile.

The shaped article may be in the form of a film or sheet preferably having a thickness of 5 to 200 $\mu$m, more preferably 10 to 150 $\mu$m. The film or sheet exhibits a satisfactory flexibility and softness.

In the carbon fibers usable for the present invention, it is preferable that the length of the carbon fibers be 3 times or more, more preferably 4 to 100 times, still more preferably 5 to 50 times, the thickness thereof.

When the carbon fibers are in a content of less than 10% by weight, have a length of less than 0.05 mm, or are replaced by conventional carbon particles, for example, carbon black particles, the resultant shaped aromatic imide polymer article exhibits a decreased dimensional and form stability at a high temperature of 300° C. or more, or a significantly reduced heat resistance. That is, the above-mentioned type of aromatic imide polymer film is easily corrugated or wrinkled at a high temperature of 300° C. or more.

Also, when the carbon fibers are in a content of more than 40% by weight or have a large length of more than 3.0 mm, it becomes difficult to evenly disperse the carbon fibers in the aromatic imide polymer matrix, the resultant dope exhibits a poor shaping property or film-forming property, and therefore, industrial production of a shaped article at a satisfactory reproducibility becomes difficult, the resultant shaped article has an undesirable rough surface having an increased roughness or a number of convexities and concavities, and exhibits a decreased heat stability and mechanical strength.

The matrix of the shaped article of the present invention comprises at least one aromatic imide polymer which may be a polymerization product of an aromatic tetracarboxylic acid component consisting of at least one member selected from the group consisting of piromellitic acid, 2,3,3',4'-biphenyltetracarboxylic acid, 3,3',4,4'-biphenyltetracarboxylic acid, 2,3,3',4'-benzophenonetetracarboxylic acid, 3,3',4,4'-benzophenonetetracarboxylic acid, and anhydrides, acid halides and lower alcohol esters of the above-mentioned tetracarboxylic acids, with an aromatic diamine component consisting of at least one member selected from the group consisting of 4,4'-diaminodiphenyl ether, 4,4'-diaminodiphenyl methane, 4,4'-diaminodiphenyl sulfon, and ortho, meta and para-phenylene diamines.

Usually, the acid component and the diamine component are used in approximately equal molar amounts. The polymerization can be carried out by an ordinary method. The polymerization procedure may include an imidization step for a resultant corresponding polyamic acid. That is, the polymerization product may be an aromatic imide polymer or an aromatic polyamic acid which is a precursor of the aromatic imide polymer.

The aromatic imide polymer preferably has a degree of imidization of about 90% or more, more preferably about 95% or more, and a large molecular weight.

In the shaped article of the present invention, the aromatic imide polymer is preferably produced by imidizing an aromatic polyamic acid which has been produced from an aromatic tetracarboxylic acid component comprising 80 molar % or more, more preferably 90 molar % or more, of at least one member selected from 2,3,3',4' -biphenyltetracarboxylic acid, 3,3',4,4'-biphenyltetracarboxylic acid and anhydrides of the above-mentioned acids with an aromatic diamine component comprising 50 molar % or more, more preferably 70 molar % or more, of at least one member selected from ortho, meta and para-phenylenediamines. This type of aromatic imide polymer exhibits a satisfactory heat stability and mechanical strength and is most appropriate for the present invention.

In the process of the present invention, the moisture content of the specific carbon fibers are controlled to a level of 1.0% by weight or less, preferably 0.5% by weight or less, by means of drying.

When the moisture content of the carbon fiber is more than 1.0% by weight, the resultant dope will contain an excessive amount of water and the resultant shaped article will contain a number of bubbles derived from the water.

The dried carbon fibers are dispersed in a polymerization medium comprising an organic polar solvent consisting of at least one member selected from, for example, N-methyl-2-pyrrolidon, N,N-dimethylacetamide, N,N-dimethylformamide, dimethylsulfoxide, sulforane, pyridine, tetramethyl urea, cresol, and phenol, at room temperature or an elevated temperature of, for example, from 0° C. to 100° C., preferably from 0° C. to 80° C., to provide a slurry containing the carbon fibers evenly dispersed in the polymerization medium.

The slurry-preparing step is followed by admixing the slurry to a polymerization mixture containing an aromatic tetracarboxylic acid component, an aromatic diamine component and, optionally, an additional amount of the polymerization medium, preferably at a temperature of 100° C. or less, more preferably 0° C. to 60° C., to provide a polymerization admixture wherein the carbon fibers are evenly dispersed in the solution of the aromatic tetracarboxylic acid and diamine component in the polymerization medium.

The resultant polymerization admixture is subjected to a polymerization procedure wherein the admixture is stirred and allowed to stand at a temperature of 100° C. or less, preferably, from 0° C. to 60° C., for about 0.5 to 50 hours, preferably from 1 to 30 hours, to allow the aromatic tetracarboxylic acid component to react with the aromatic diamine component to produce an aromatic polyamic acid or aromatic imide polymer.

Optionally, an additional amount of the polymerization medium or an additive is added to the polymerization admixture to control the rotation viscosity of the polymerization admixture to a desired level, or the polymerization admixture is defoamed. The resultant dope consists of a solution of the resultant polymerization product consisting of an aromatic polyamic acid, an aromatic imide polymer or a mixture thereof, and the carbon fibers evenly dispersed in the solution.

In the preparation of the polymerization admixture, the slurry containing the carbon fiber may be admixed to a mixture of the aromatic tetracarboxylic acid and diamine components or to one of the aromatic tetracarboxylic acid and diamine components and then to the remaining component. In this preparation, the slurry should be evenly admixed with the aromatic tetracarboxylic acid and diamine components while the resultant admixture is well stirred. Also, preferably the polymerization is carried out while the admixture is stirred.

In the process of the present invention, it is essential that the carbon fiber-containing slurry is admixed with the polymerization mixture containing the aromatic tetracarboxylic acid and diamine components before the start of the polymerization procedure.

If the carbon fiber-dispersed slurry is mixed with a polymerization product solution, the resultant dope will not produce a shaped aromatic imide polymer article containing evenly dispersed carbon fibers therein, and having an excellent electroconductivity and a satisfactory heat resistance.

The dope is subjected to shaped article-producing procedures. For example, the dope is converted to a thin layer by a conventional film-forming process. For instance, the dope is spread on a flat surface of a substrate, for example, a glass plate or metal plate, a curved surface of a substrate, for example, a peripheral surface of a metal drum, or a flat or curved surface of an endless metal belt, to form a thin film layer of the dope having an even thickness. Otherwise, the dope is molded in a mold having a desired shape.

The shaped dope is gradually dried, preferably at a temperature of about 50° to 200° C., more preferably, 60° to 180° C., by evaporating the polymerization medium (organic polar solvent). The resultant shaped solid article contains a small amount of the polymerization medium. The shaped article is heated at a high temperature of from about 200° C. to 500° C., preferably, from 250° C. to 450° C., to completely dry and heat set the shaped article, and if necessary, to convert the aromatic polyamic acid in the shaped article to the corresponding aromatic imide polymer.

A preferable dope is prepared by admixing a carbon fiber-dispersed slurry to a polymerization mixture containing an aromatic tetracarboxylic acid component containing at least 60 molar % or more, more preferably at least 70 molar %, of 2,3,3',4'- and/or 3,3',4,4'-biphenyltetracarboxylic acid or its dianhydride, and an aromatic diamine component containing at least 50 molar %, more preferably, 60 molar %, of a phenylenediamine, dissolved in an organic polar solvent usable as a polymerization medium, and by subjecting the resulting admixture to a polymerization procedure at a temperature of about 80° C.

In the aromatic polyamic acid-containing dope of the present invention, it is preferable that the dope have a logarithmic viscosity number (inherent viscosity) of 0.1 or more, more preferably from 0.2 to 6, still more preferably from 0.3 to 5, determined in a solution thereof in N-methyl-2-pyrrolidone at a concentration of 0.5 g/100 ml and at a temperature of 30° C.

In the process of the present invention, the dope preferably contains the polymerization product in an amount of from about 5% to 40% by weight, more preferably 8% to 30% by weight, still more preferably 10% to 25% by weight, and has a rotation viscosity of about 10 to 100,000 poise, more preferably from 20 to 50,000 poise, still more preferably from 50 to 30,000 poise. This type of dope can be easily shaped, for instance, into a thin filmy layer.

The specific examples presented below will serve to more fully elaborate the ways in which the present invention can be practically used. However, it should be understood that the examples are only illustrative and in no way limit the scope of the present invention.

EXAMPLE 1

A drying oven was charged with short cut carbon fibers having a thickness of 15 $\mu$m and a length of 0.15 mm. The short cut carbon fibers were dried at a temperature of 120° C. for 6 hours. The dried carbon fibers had a moisture content of 0.1% by weight or less.

In a cylindrical polymerization vessel having a capacity of 50 l, 3.264 kg of the dried carbon fibers were evenly dispersed in 34 kg of an organic polar solvent consisting of N,N-dimethylacetamide at room temperature and the resultant mixture was stirred to provide a slurry.

The resultant carbon fiber-dispersed slurry was admixed with 5.458 kg of 3,3',4,4'-biphenyltetracarboxylic dianhydride (BPDA) and then gradually with 2.006 kg of p-phenylenediamine (PPD), while the admixture was stirred, to provide a polymerization admixture.

The resultant polymerization admixture was stirred at a temperature of 30° C. for 20 hours to allow BPPA and PPD to polymerize and to provide an aromatic polyamic acid-containing dope.

The resultant aromatic polyamic acid exhibited a logarithmic viscosity number of 3.00 determined in a solution thereof in N-methyl-2-pyrrolidone at a concentration of 0.5 g/100 ml at 30° C. The resultant dope exhibited a rotation viscosity of 20,000 poise at a temperature of 30° C.

The dope was defoamed, the defoamed dope was extruded in the form of a thin film through a slit of a T-die, and the extruded thin film-shaped dope stream was spread on a smooth peripheral surface of a rotating metal drum. The thin film-shaped dope on the metal drum surface was gradually solidified by blowing hot air toward the thin film-shaped dope at a temperature of 120° C. to allow the solvent to gradually evaporate.

The resultant solidified film contained about 40% by weight of the residual solvent.

The solidified film was forwarded through a high temperature drier while the two edges of the film were held by a number of pins of a pin tenter, and while the film was exposed to a radiation heater which was capable of elevating the surface temperature of the film to about 250° C. to 550° C., and was blown by hot air stream at a temperature of 400° C. The residual solvent in the solidified film was thus completely removed and the film was heat set. Furthermore, the aromatic polyamic acid in the solidified film was converted to the corresponding aromatic imide polymer.

The resultant aromatic imide polymer film had an thickness of 110 $\mu$m and contained 30.3% by weight of the short cut carbon fibers evenly dispersed in the aromatic imide polymer matrix.

The film had a dense surface and exhibited a tensile strength of 17.8 kg/mm$^2$ and an ultimate elongation of 5%.

A portion of the film was cut out and heated to a temperature of 450° C. No bulging or foaming phenomenon were found in the heated piece of the film.

Another piece of the film was left in a hot air atmosphere at a temperature of 500° C. for 30 minutes. The weight decrease of the heated piece of the film was 4.2% by weight.

The film exhibited an inherent volume resistivity of 700 k$\Omega$.cm and a surface resistivity of 7 k$\Omega$.

EXAMPLE 2

A carbon fiber-dispersed polymerization admixture was prepared by the same procedures as those described in Example 1 except that, in the organic polar solvent, N,N-dimethyl acetamide was replaced by N-methyl-2-pyrrolidone.

The resultant polymerization admixture was converted to a dope by the same procedure as those described in Example 1. The dope exhibited a rotation viscosity of 25,000 poise at a temperature of 30° C. and contained an aromatic polyamic acid having a logarithmic viscosity number of 3.20 determined by the above-mentioned conditions.

The dope was converted to a heat-set aromatic imide polymer film having a thickness of 110 $\mu$m and containing 30.3% by weight of the short cut carbon fibers, in the same manner as described in Example 1.

The film had a dense surface and exhibited a tensile strength of 18.9 kg/mm$^2$ an and ultimate elongation of 6%.

In the heating test applied to a piece of the film at 450° C., no bulging or foaming phenomena were found.

In the hot air heating test applied to another piece of the film at 500° C. for 30 minutes, the weight decrease of the film piece was 4.2% by weight.

The film exhibited an inherent volume resistivity of 750 kΩ.cm and a surface resistivity of 8 kΩ.

EXAMPLE 3

A dope was prepared by the same procedures as those described in Example 1 except that the short cut carbon fibers were used in an amount of 1.920 kg.

The resultant dope exhibited a rotation viscosity of 18,000 poise at 30° C. and contained an aromatic polyamic acid having a logarithmic viscosity number of 2.65 determined in the same manner as described above.

The dope was connected to a heat-set aromatic imide polymer film in the same manner as described in Example 1.

The film contained 20.5% by weight of the short cut carbon fibers evenly dispersed in the aromatic imide polymer matrix and had a thickness of 110 μm.

The film had a dense surface and exhibited a tensile strength of 15.6 kg/mm² and an ultimate elongation of 7%.

In the heating test, a temperature of 450° C. was applied to a piece of the film, and no bulging and foaming phenomena were found in the film piece.

In the hot air heating test applied to another piece of the film at 500° C. for 30 minutes, the weight decrease of the film piece was 1.8% by weight.

The film exhibited an inherent volume resistivity of 60,000 kΩ.cm and a surface resistivity of 230 kΩ.

COMPARATIVE EXAMPLE 1

A dope was prepared by the same procedures as those described in Example 1 except that the polymerization vessel was charged with a solution of BPDA and PPD in N,N-dimethylacetamide, and the solution was stirred for one hour and then admixed with the short cut carbon fibers.

The dope contained an aromatic polyamic acid having a logarithmic viscosity number of 3.05 determined in the same manner as described in Example 1, and had a rotation viscosity of 22,000 at a temperature of 30° C.

The dope was continuously converted to a solid aromatic imide polymer film having 30.4% by weight of the short cut carbon fibers and having a thickness of 90 μm, by the same procedures as those described in Example 1.

In the observation of the resultant film, it was found that the carbon fibers were unevenly distributed in the aromatic imide polymer matrix, portions of the carbon fibers agglomerated, and the surfaces of the film were rough and had a number of convexities and concavities. Also, it was found that the film had a small tensile strength of 12.1 kg/mm² and a poor ultimate elongation of 2% and, therefore, appeared to be impractical for actual use.

COMPARATIVE EXAMPLE 2

The same procedures as those described in Example 1 were carried out except that the drying procedure was omitted and non-dried short cut carbon fibers having a moisture content of 8% by weight were dispersed in N,N-dimethyl acetamide.

It was found that the resultant film contained a number of pores and foams and exhibited a poor mechanical strength. Accordingly, the film appeared to be impractical for actual use.

COMPATATIVE EXAMPLE 3

A dope was prepared by the same procedures as those described in Example 1 except that the short cut carbon fibers were replaced by grain-shaped carbon particles which were available under the trademark of VULCAN XC-72, Cabot Co., and had an average size of 0.3 μm.

The resultant dope contained an aromatic polyamic acid having a logarithmic viscosity number of 2.80 determined in the same manner as that described in Example 1, and had a rotation viscosity of 20,000 poise at a temperature of 30° C.

The dope was converted to a solid film having a thickness of 90 μm by the same procedures as those described in Example 1.

The film contained 30.4% by weight of the carbon particles, and exhibited a satisfactory tensile strength of 16.5 kg/mm² and an ultimate elongation of 5%. However, when the film was heated to a high temperature of 450° C. or more, a number of bulges, corrugations and wrinkles were formed in the film. That is, the film appeared to be impractical for actual use at a high temperature.

We claim:

1. A process for producing a shaped electro-conductive aromatic imide polymer article, comprising the steps of:
    drying short cut carbon fibers having a thickness of 1 to 30 μm and a length of 0.05 to 3.0 mm to a moisture content of 1.0% by weight or less;
    dispersing the dried carbon fibers in an organic polymerization medium to provide a slurry;
    admixing the slurry with a polymerization mixture containing an aromatic tetracarboxylic acid component and an aromatic tetracarboxylic acid and aromatic diamine components and then with the remaining component to evenly disperse the dried carbon fibers in the polymerization mixture;
    polymerizing the aromatic tetracarboxylic acid component with the aromatic diamine component in the organic polymerization medium at a temperature of 100° C. or less in the presence of the dried carbon fibers evenly dispersed in the polymerization mixture to provide a dope containing a resultant polymerization product dissolved in the polymerization medium and the carbon fibers evenly dispersed in the polymerization product solution; and
    subjecting the dope to shaped article-producing procedures wherein the dope is shaped into a predetermined form and the shaped dope is solidified by removing the polymerization medium to provide a desired shaped article comprising a matrix comprising the resultant aromatic imide polymer and the carbon fibers evenly dispersed in the aromatic imide polymer matrix, the dried carbon fibers in the slurry being in an amount of 10% to 40% based on the resultant shaped article.

2. The process as claimed in claim 1, wherein the polymerization medium comprises at least one member selected from N-methyl-2-pyrrolidone, N,N-dimethylacetamide, N,N-dimethylformamide, dimethylsulfoxide, sulforane, pyridine, tetramethyl urea, cresol and phenol.

3. The process as claimed in claim 1, wherein the admixing step is carried out at a temperature of 100° C. or less.

4. The process as claimed in claim 1, wherein the polymerization product is an aromatic polyamic acid, and in the shaped article-producing procedures, the shaped dope is solidified at a temperature of from 50° C. to 200° C., and then the aromatic polyamic acid in the solidified shaped dope is converted into the corresponding aromatic imide polymer at a temperature of from 200° C. to 500° C.

5. A shaped electroconductive aromatic imide polymer article prepared by the process of claim 1.

* * * * *